United States Patent
Liu et al.

(10) Patent No.: US 8,722,146 B2
(45) Date of Patent: May 13, 2014

(54) METHOD FOR MAKING LIQUID SEPARATION MEMBRANE

(75) Inventors: Jianli Liu, Tianjin (CN); Changfa Xiao, Tianjin (CN); Xiaoyu Hu, Tianjin (CN); Wujiang Zhang, Tianjin (CN); Ruobing Hou, Tianjin (CN)

(73) Assignee: Tianjin Motimo Membrane Technology Co., Ltd., Tianjin (CN)

( * ) Notice: Subject to any disclaimer, the term of this patent is extended or adjusted under 35 U.S.C. 154(b) by 32 days.

(21) Appl. No.: 13/539,514

(22) Filed: Jul. 2, 2012

(65) Prior Publication Data

US 2012/0276294 A1    Nov. 1, 2012

Related U.S. Application Data

(63) Continuation-in-part of application No. PCT/CN2011/081157, filed on Oct. 23, 2011.

(30) Foreign Application Priority Data

Dec. 16, 2010 (CN) .......................... 2010 1 0590152

(51) Int. Cl.
*B01D 67/00* (2006.01)

(52) U.S. Cl.
USPC ........... 427/322; 204/296; 204/282; 204/252; 427/243; 427/246

(58) Field of Classification Search
USPC ............. 427/332, 243, 246; 429/30; 204/296, 204/282, 252
See application file for complete search history.

(56) References Cited

U.S. PATENT DOCUMENTS

2008/0113242 A1*  5/2008  Smith et al. .................... 429/30

FOREIGN PATENT DOCUMENTS

| CN | 1128176 | * | 8/1996 |
| CN | 101053778 | * | 10/2007 |

* cited by examiner

*Primary Examiner* — Timothy Meeks
*Assistant Examiner* — Nathan T Leong
(74) *Attorney, Agent, or Firm* — Matthias Scholl P.C.; Matthias Scholl

(57) ABSTRACT

A method for making a liquid separation membrane, including: (1) providing a polyvinylidene fluoride liquid separation membrane or polypropylene liquid separation membrane prepared by a thermally induced phase separation method as a substrate membrane, soaking the substrate membrane with water or a weak polar organic liquid to make membrane pores of the substrate membrane filled with the liquid, the soaking time being between 0.5 s and 1 min, and the weak polar organic liquid being indissolvable and compatible with the polyvinylidene fluoride liquid separation membrane or polypropylene liquid separation membrane; (2) coating a casting solution of polyvinylidene fluoride on the surface of the soaked substrate membrane obtained in step (1), and quickly soaking the substrate membrane in a coagulating bath heated to a temperature of 60-100° C. for curing to yield the liquid separation membrane.

4 Claims, No Drawings

METHOD FOR MAKING LIQUID SEPARATION MEMBRANE

CROSS-REFERENCE TO RELATED APPLICATIONS

This application is a continuation-in-part of International Patent Application No. PCT/CN2011/081157 with an international filing date of Oct. 23, 2011, designating the United States, now pending, and further claims priority benefits to Chinese Patent Application No. 201010590152.3 filed Dec. 16, 2010. The contents of all of the aforementioned applications, including any intervening amendments thereto, are incorporated herein by reference.

BACKGROUND OF THE INVENTION

1. Field of the Invention

The invention relates to the field of liquid separation membranes, and more particularly to a method for making a liquid separation membrane.

2. Description of the Related Art

Due to excellent chemical and thermal stability, the liquid separation membrane of polyvinylidene fluoride has been widely used for treatment and reuse of industrial wastewater and domestic sewage as well as pretreatment of reverse osmosis process. In use, the liquid separation membrane of polyvinylidene fluoride is subjected to the impact of water flow (including cross-flow filtration, backwashing, etc.), air flow (including air scrubbing, aeration shaking, etc.), or a combination thereof. Thus, the liquid separation membrane requires a high strength for ensuring the normal operation, which is particularly prominent in a submerged membrane module adopted in the technical application process of a membrane bioreactor (MBR).

Conventionally, there are two methods for industrial preparation of the liquid separation membrane of polyvinylidene fluoride: one is an immersion precipitation method. The membrane prepared by the method has the advantages of high separation accuracy and good hydrophilicity, but the improvement of mechanical properties of the prepared membrane is usually restricted, and the strength of the liquid separation membrane prepared by the method is enhanced only through increasing the thickness of the membrane itself and a sponge layer thereof, however, the membrane permeability is usually reduced. The other is a thermally induced phase separation method. The membrane prepared by the method has the characteristic of better mechanical properties, but the filtering accuracy and the permeability cannot usually be balanced. According to the separation membrane formation principle, there is no a compact layer on the surface of the membrane prepared by the thermally induced phase separation method, the embedded pollutants are easily formed in the using process and difficult to remove, and the requirement on cleaning process is usually high. Therefore, to ensure that the liquid separation membrane has both high interception accuracy and permeability and good mechanical properties has became an important subject of research and development of the liquid separation membrane.

SUMMARY OF THE INVENTION

In view of the above-described problems, it is one objective of the invention to provide a method for making a liquid separation membrane which has good mechanical properties and high interception accuracy and is not easy to peel off during use.

To achieve the above objective, in accordance with one embodiment of the invention, there is provided a method for making a liquid separation membrane, the method comprising:

(1) providing a polyvinylidene fluoride liquid separation membrane or polypropylene liquid separation membrane prepared by a thermally induced phase separation method as a substrate membrane, soaking the substrate membrane with water or a weak polar organic liquid to make membrane pores of the substrate membrane filled with the liquid, the soaking time being between 0.5 s and 1 min, and the weak polar organic liquid being indissolvable and compatible with the polyvinylidene fluoride liquid separation membrane or polypropylene liquid separation membrane;

(2) coating a casting solution of polyvinylidene fluoride on the surface of the soaked substrate membrane obtained in step (1), and quickly soaking the substrate membrane in a coagulating bath heated to a temperature of 60-100° C. for curing to yield the liquid separation membrane.

In a class of this embodiment, the polyvinylidene fluoride liquid separation membrane or polypropylene liquid separation membrane prepared by the thermally induced phase separation method comprises a hollow fiber membrane and a flat membrane, and to enhance the porosity of the prepared composite and ensure the uniformity of coating, the polyvinylidene fluoride liquid separation membrane or polypropylene liquid separation membrane prepared by the thermally induced phase separation method is preferably 0.1-10 micrometers in pore size and 5-15 N in breaking strength.

In a class of this embodiment, the casting solution of polyvinylidene fluoride (i.e., the polyvinylidene fluoride membrane formation system in the thermally induced phase separation method) is same as that in the prior art, and prepared by deaeration of a mixture comprising polyvinylidene fluoride, a solvent, and an additive, and according to the mass percent, polyvinylidene fluoride accounts for 10-35%, the solvent accounts for 60-80%, and the additive accounts for 5-30%. Both the solvent and additive are same as those in the prior art. The solvent comprises various good solvents of polyvinylidene fluoride, such as N,N-dimethyl formamide, N,N-dimethyl acetamide, and dimethyl sulfoxide, and the additive comprises various water-soluble components such as polyethylene glycol, polyvinyl pyrrolidone, lithium chloride, and Tween 80.

In a class of this embodiment, the medium of the coagulating bath is same as that in the prior art, and can adopt water or an aqueous solution of a solvent.

In a class of this embodiment, the weak polar organic liquid is ethanol, glycerin, isopropyl alcohol, or polyethylene glycol with molecular weight of less than 600.

The polypropylene liquid separation membrane prepared by the thermally induced phase separation method can be suitable for the cases of low requirement for backwashing after being compounded.

Advantages of the invention are summarized below:

1. In the method for making the liquid separation membrane, the polyvinylidene fluoride liquid separation membrane or polypropylene liquid separation membrane provided with excellent mechanical properties and prepared by the thermally induced phase separation method is used as the substrate membrane, and after the substrate membrane pore is filled with water or the weak polar solvent through soaking, the casting solution of polyvinylidene fluoride is compounded outside the substrate membrane to form a liquid separation membrane structure with higher separation accuracy and anti-pollution capacity, so that the prepared liquid separation membrane has both good mechanical properties and higher interception accuracy, and meets the dual requirements of MBR and other application processes to the pore size and mechanical properties of the liquid separation membrane. Using water or the weak polar organic liquid for sufficient soakage is the key of the invention, the dissolution recovery of the solvent components in the casting solution to the pore structure on the surface of the polyvinylidene fluoride liquid separation membrane or polypropylene liquid separation membrane prepared by the thermally induced phase separation method can be avoided in the compounding process, and the membrane permeability is further ensured.

2. When both the substrate membrane and the casting solution are polyvinylidene fluoride, the method for making the liquid separation membrane can be called as bulk compounding, the matrix phase materials on the inner layer and outer layer do not have difference on compatibility, and the inner layer and outer layer can be more closely combined, which is significant for prolonging the service life of the liquid separation membrane by enhancing the anti-backwashing performance of the liquid separation membrane.

3. Both the thermally induced phase separation method and immersion precipitation method (also called solution phase inversion method) which are involved in the method for making the liquid separation membrane have realized the continuous and large-scale production in industrial circles, and especially, the method for making the casting solution by the immersion precipitation method is more mature, thus the rapid implementation of industrialization is favorable.

DETAILED DESCRIPTION OF THE EMBODIMENTS

For further illustrating the invention, experiments detailing a method for making a liquid separation membrane are described below. It should be noted that the following examples are intended to describe and not to limit the invention.

Example 1

(1) A polyvinylidene fluoride hollow fiber membrane prepared by the thermally induced phase separation method and provided with average pore size of 0.1 micrometer and breaking strength of 5 N is used as a substrate membrane, and then the substrate membrane is soaked for 0.5 s with ethanol at room temperature, so that the membrane pore of the polyvinylidene fluoride hollow fiber membrane is filled with liquid ethanol.

(2) Polyvinylidene fluoride accounting for 10% of total mass of the system, N,N-dimethyl formamide accounting for 80% of total mass of the system, and polyvinyl pyrrolidone accounting for 10% of total mass of the system are mixed, evenly dissolved, and deaerated to obtain a casting solution. The casting solution is evenly coated on the surface of the substrate membrane obtained in step (1) and filled with the liquid ethanol in the membrane pore, and then rapidly soaked in water at the temperature of 60° C. for curing, so as to obtain the liquid separation membrane with breaking strength of 6.5 N and average pore size of 0.08 micrometer. The liquid separation membrane is continuously backwashed for 10 h under 0.1 MPa, and the inner layer is not separated from the outer layer.

Example 2

(1) A polyvinylidene fluoride hollow fiber membrane prepared by the thermally induced phase separation method and provided with average pore size of 10 micrometer and breaking strength of 15 N is used as a substrate membrane, and then the substrate membrane is soaked for 30 s with glycerin at room temperature, so that the membrane pore of the polyvinylidene fluoride hollow fiber membrane is filled with glycerin.

(2) Polyvinylidene fluoride accounting for 35% of total mass of the system, N,N-dimethyl formamide accounting for 60% of total mass of the system, and polyethylene glycol accounting for 5% of total mass of the system are mixed, evenly dissolved, and deaerated to obtain a casting solution. The casting solution is evenly coated on the surface of the substrate membrane obtained in step (1) and filled with glycerin in the membrane pore, and then rapidly soaked in 50% dimethyl acetamide solution at the temperature of 100° C. for curing, so as to obtain the liquid separation membrane with breaking strength of 17 N and average pore size of 0.05 micrometer. The liquid separation membrane is continuously backwashed for 10 h under 0.1 MPa, and the inner layer is not separated from the outer layer.

Example 3

(1) A polyvinylidene fluoride hollow fiber membrane prepared by the thermally induced phase separation method and provided with average pore size of 0.5 micrometer and breaking strength of 5 N is used as a substrate membrane, and then the substrate membrane is soaked for 0.5 s with isopropyl alcohol at room temperature, so that the membrane pore of the polyvinylidene fluoride hollow fiber membrane is filled with isopropyl alcohol.

(2) Polyvinylidene fluoride accounting for 20% of total mass of the system, N,N-dimethyl formamide accounting for 50% of total mass of the system, and an additive comprising lithium chloride and Tween 80 with mass ratio 1:5 and accounting for 30% of total mass of the system are mixed, evenly dissolved, and deaerated to obtain a casting solution. The casting solution is evenly coated on the surface of the substrate membrane obtained in step (1) and filled with isopropyl alcohol in the membrane pore, and then rapidly soaked in water at the temperature of 60° C. for curing, so as to obtain the liquid separation membrane with breaking strength of 6 N and average pore size of 0.1 micrometer. The liquid separation membrane is continuously backwashed for 10 h under 0.1 MPa, and the inner layer is not separated from the outer layer.

Example 4

(1) A polyvinylidene fluoride hollow fiber membrane prepared by the thermally induced phase separation method and provided with average pore size of 10 micrometer and breaking strength of 15 N is used as a substrate membrane, and then the substrate membrane is soaked for 30 s with polyethylene glycol 600 at room temperature, so that the membrane pore of the polyvinylidene fluoride hollow fiber membrane is filled with polyethylene glycol 600.

(2) Polyvinylidene fluoride accounting for 35% of total mass of the system, dimethyl sulfoxide accounting for 60% of total mass of the system, and polyethylene glycol accounting for 5% of total mass of the system are mixed, evenly dissolved, and deaerated to obtain a casting solution. The casting solution is evenly coated on the surface of the substrate membrane obtained in step (1) and filled with polyethylene glycol 600 in the membrane pore, and then rapidly soaked in 50% dimethyl acetamide solution at the temperature of 100° C. for curing, so as to obtain the liquid separation membrane with breaking strength of 17.3 N and average pore size of 0.06 micrometer. The liquid separation membrane is continuously backwashed for 10 h under 0.1 MPa, and the inner layer is not separated from the outer layer.

Example 5

(1) A polyvinylidene fluoride hollow fiber membrane prepared by the thermally induced phase separation method and provided with average pore size of 1 micrometer and breaking strength of 10 N is used as a substrate membrane, and then the substrate membrane is soaked for 1 min with water at room temperature, so that the membrane pore of the polyvinylidene fluoride hollow fiber membrane is filled with water.

(2) Polyvinylidene fluoride accounting for 10% of total mass of the system, N,N-dimethyl formamide accounting for 80% of total mass of the system, and polyvinyl pyrrolidone accounting for 10% of total mass of the system are mixed, evenly dissolved, and deaerated to obtain a casting solution. The casting solution is evenly coated on the surface of the substrate membrane obtained in step (1) and filled with water in the membrane pore, and then rapidly soaked in water at the temperature of 70° C. for curing, so as to obtain the liquid separation membrane with breaking strength of 11.8 N and average pore size of 0.08 micrometer. The liquid separation membrane is continuously backwashed for 10 h under 0.1 MPa, and the inner layer is not separated from the outer layer.

Example 6

(1) A polypropylene hollow fiber membrane prepared by the thermally induced phase separation method and provided with average pore size of 0.5 micrometer and breaking strength of 10 N is used as a substrate membrane, and then the substrate membrane is soaked for 1 min with ethanol at room temperature, so that the membrane pore of the polypropylene hollow fiber membrane is filled with ethanol.

(2) Polyvinylidene fluoride accounting for 10% of total mass of the system, N,N-dimethyl formamide accounting for 80% of total mass of the system, and polyvinyl pyrrolidone accounting for 10% of total mass of the system are mixed, evenly dissolved, and deaerated to obtain a casting solution. The casting solution is evenly coated on the surface of the substrate membrane obtained in step (1) and filled with ethanol in the membrane pore, and then rapidly soaked in water at the temperature of 70° C. for curing, so as to obtain the liquid separation membrane with breaking strength of 10.5 N and average pore size of 0.08 micrometer. The liquid separation membrane is continuously backwashed for 8 h under 0.1 MPa, and the inner layer is not separated from the outer layer.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for making a liquid separation membrane, the method comprising:
   a) providing a polyvinylidene fluoride liquid separation membrane or polypropylene liquid separation membrane prepared by a thermally induced phase separation method as a substrate membrane, soaking the substrate membrane with water or a weak polar organic liquid to make membrane pores of the substrate membrane filled with the liquid, the soaking time being between 0.5 s and 1 min, wherein the weak polar organic liquid is ethanol, glycerin, isopropyl alcohol, or polyethylene glycol having a molecular weight of less than 600; and
   b) coating a casting solution of polyvinylidene fluoride on the surface of the soaked substrate membrane obtained in step (a), and quickly soaking the substrate membrane in a coagulating bath heated to a temperature of 60-100° C. for curing to yield the liquid separation membrane.

2. The method of claim 1, wherein the polyvinylidene fluoride liquid separation membrane or polypropylene liquid separation membrane prepared by the thermally induced phase separation method is between 0.1 and 10 micrometers in pore size and between 5 and 15 N in breaking strength.

3. The method of claim 1, wherein the casting solution of polyvinylidene fluoride is prepared by deaeration of a mixture comprising polyvinylidene fluoride, a solvent, and an additive, and according to the mass percent, polyvinylidene fluoride accounts for 10-35%, the solvent accounts for 60-80%, and the additive accounts for 5-30%.

4. The method of claim 1, wherein a medium of the coagulating bath is water or an aqueous solution of a solvent.

* * * * *